United States Patent  [10] Patent No.: US 8,452,869 B2
Kang et al.  (45) Date of Patent: May 28, 2013

(54) SYSTEM AND METHOD FOR MANAGING CUSTOMIZED SERVICE LEVEL AGREEMENT MONITORING

(75) Inventors: Hyun Chul Kang, Daejeon (KR); Eunjin Ko, Daejeon (KR); Byung Yun Lee, Daejeon (KR); Byung Sun Lee, Daejeon (KR)

(73) Assignees: Electronics and Telecommunications Research Institute, Daejeon (KR); KT Corporation, Kyeonggi-do (KR)

( * ) Notice: Subject to any disclaimer, the term of this patent is extended or adjusted under 35 U.S.C. 154(b) by 249 days.

(21) Appl. No.: 12/912,170

(22) Filed: Oct. 26, 2010

(65) Prior Publication Data
US 2011/0138040 A1 Jun. 9, 2011

(30) Foreign Application Priority Data

Dec. 9, 2009 (KR) ........................ 10-2009-0121972
Feb. 16, 2010 (KR) ........................ 10-2010-0013897

(51) Int. Cl.
*G06F 15/173* (2006.01)
(52) U.S. Cl.
USPC ............................ 709/224; 709/223; 709/227

(58) Field of Classification Search
USPC .......................................... 709/223, 224, 227
See application file for complete search history.

(56) References Cited

U.S. PATENT DOCUMENTS

| 6,542,593 | B1 * | 4/2003 | Bowman-Amuah ..... 379/201.03 |
| 2002/0107908 | A1 * | 8/2002 | Dharanikota ................. 709/203 |
| 2009/0204583 | A1 * | 8/2009 | Hechler et al. .................... 707/3 |

FOREIGN PATENT DOCUMENTS

| KR | 1020050054665 | 6/2005 |
| KR | 10-2007-0060310 | 6/2007 |
| KR | 10-2008-0050187 | 6/2008 |
| KR | 10-0850968 | 6/2008 |
| KR | 1020080052327 | 6/2008 |

* cited by examiner

*Primary Examiner* — Phuoc Nguyen
(74) *Attorney, Agent, or Firm* — Nelson Mullins Riley & Scarborough LLP; EuiHoon Lee, Esq.

(57) ABSTRACT

A system for managing customized SLA monitoring for providing a customized SLA monitoring service is linked with an external system to receive an external index order for a customer line subscribed in the service. The system reflects demands of the customer included in the external index order on SLA management data to update the SLA management data. Further, the system uses the updated SLA management data to determine whether to monitor with the external system and the customer line according to the result of the determination.

10 Claims, 6 Drawing Sheets

FIG. 5

SYSTEM AND METHOD FOR MANAGING CUSTOMIZED SERVICE LEVEL AGREEMENT MONITORING

CROSS-REFERENCE TO RELATED APPLICATION

This application claims priority to and the benefit of Korean Patent Applications No. 10-2009-0121972 and No. 10-2010-0013897 filed in the Korean Intellectual Property Office on Dec. 9, 2009 and Feb. 16, 2010, the entire contents of which are incorporated herein by reference.

BACKGROUND OF THE INVENTION (a) Field of the Invention

The present invention relates to a system and a method for managing customized service level agreement (SLA) monitoring, and more particularly, to a system and a method for managing customized SLA monitoring in a public data network.

(b) Description of the Related Art

The custom recognition for service quality level has been positively changed according to the change in a communication network environment. As a result, the importance of the custom-centered quality management is being increased in order to solve customer complaints.

As such, as the importance of the customer-centered quality is increased, the known system for managing service level agreement (SLA) monitors quality management and index based on the same quality management index and index value for all the customers that subscribe in the same services. In other words, the customer-centered quality management is performed so that the customer can select index meeting his/her quality service using pattern.

The SLA provider performs various efforts, etc. to prevent quality information on a customer SLA line from violating the SLA index that is promised with the customer. However, the system for managing SLA according to the related art may violate the SLA quality index. Alternatively, the system for managing SLA according to the related art sends a message to an operator in order to report the line violating the SLA quality index and allows the operator to confirm the message and then take action to make the preventive effects different depending on the taken action, such that it becomes hard to quickly take action.

Meanwhile, the system for managing SLA according to the related art collects the SLA information on the customers by being connected with systems of different type and integrates and performs the quality management for the SLA line. As such, when performing the quality management by being connected with the system between different devices, the quality management of the customer may be greatly affected by the line service work of the worker and the processing time of facilities handling work.

As described above, although the monitoring function for each system is provided to meet characteristics of each system, the monitoring function that enable the operator to integrate and manage all the situations of the customer lines, including the external system, has not yet been provided for the SLA customer line, which leads to a problem in the quality management and the customer data management.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an SLA monitoring service commonly applied to all subscribing customers as well as a customized SLA monitoring service depending on customized indexes set by each customer.

An exemplary embodiment of the present invention provides a system for managing customized SLA monitoring by being linked with an external system, including:

a line information management unit that is linked with the external system to receive an external index order for a customer line subscribed in a customized SLA monitoring service and update SLA management data by reflecting demand of the customer included in the external index order on the SLA management data; and a monitoring management unit that performs integrated monitoring on the external system linked with the customer line by using the SLA management data updated by the line information management unit, wherein the monitoring management unit maps a monitoring term for the integrated monitoring by using the SLA management data and performs the integrated monitoring.

Another embodiment of the present invention provides a method for managing customized SLA monitoring by being linked with an external system, including:

receiving an external index order for a customer line subscribed in a customized SLA monitoring service by being linked with the external system;

updating SLA management data by reflecting demands of the customer included in the external index order on the SLA management data;

determining whether to monitor the external system by using the updated SLA management data; and performing integrated monitoring on the customer line and the external system according the result of the determination.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

Figure 1:
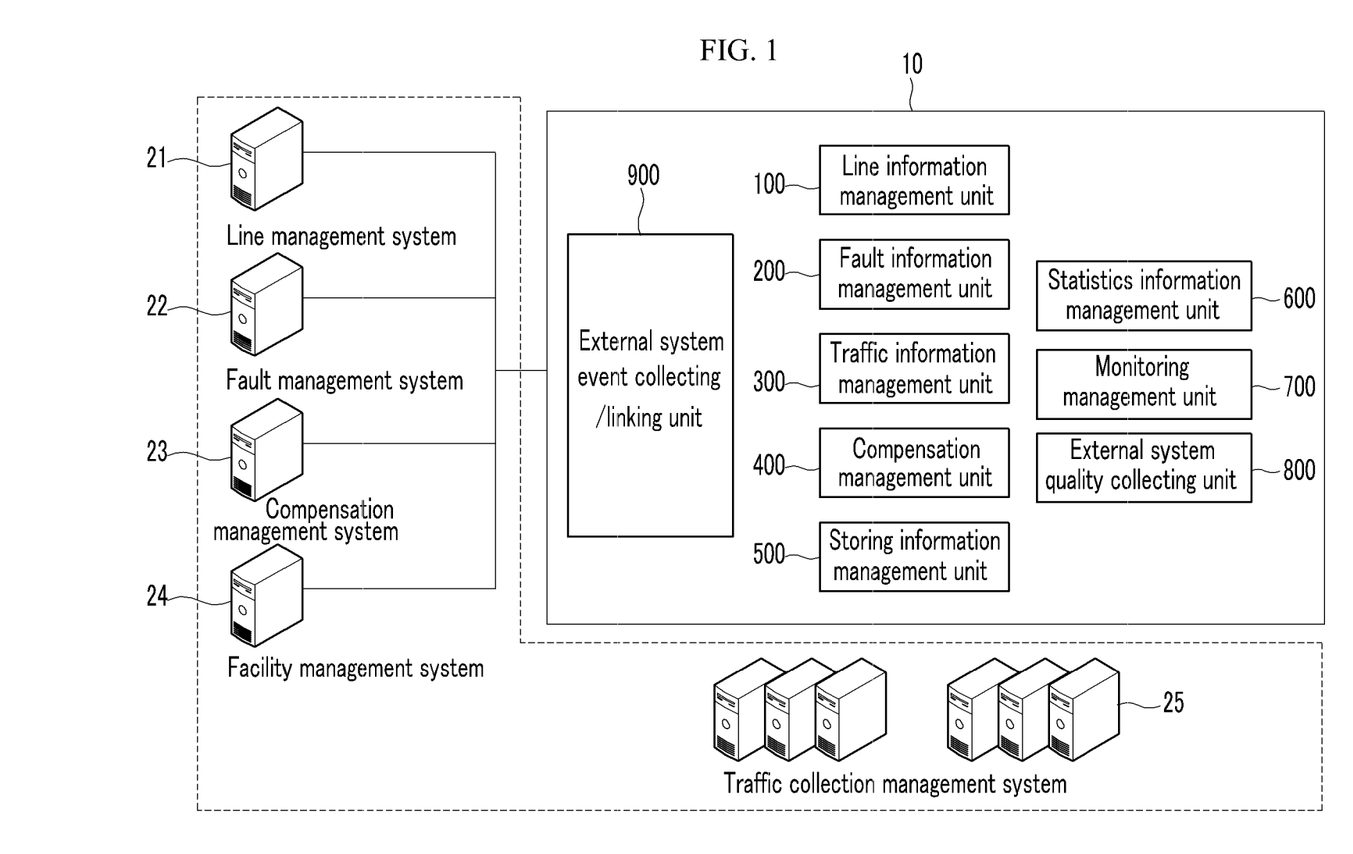
FIG. 1 is a diagram schematically showing a system for managing customized SLA monitoring according to an exemplary embodiment of the present invention.

FIG. 1 is a diagram schematically showing a system for managing customized SLA monitoring according to an exemplary embodiment of the present invention.

As shown in FIG. 1, a system 10 for managing customized SLA monitoring for providing customized SLA monitoring services according to an exemplary embodiment of the present invention provides customized indexes in a customer unit for a quality level for each customer and manages the quality level for the customized indexes selected by customers. The system 10 for managing customized SLA monitoring is connected with an external system 20 such as a line management system 21, a fault management system 22, a compensation management system 23, a facility management system 24, and a traffic collection management system 25 collects and manages information associated with the customers subscribing in the customized SLA monitoring services (hereinafter, referred to as "SLA customer"). The system 10 for managing customized SLA monitoring uses the information collected from the external system 20 to monitor and prevent whether to violate the SLA contract.

The system 10 for managing customized SLA monitoring includes a line information management unit 100, a fault information management unit 200, a traffic information management unit 300, a compensation management unit 400, a storing information management unit 500, a statistic information management unit 600, a monitoring management unit 700, an external system quality collecting unit 800, and an external system event collecting/linking unit 900.

The line information management unit 100 is operated by being linked with external system 20 and collectively manages all the line information of the SLA customer by using the SLA management data. Specifically, the line information management unit 100 reflects the line order of the SLA customer input from the line management system 21 of the external system 20. The line information processing regulation of the line information management unit 100 indicates that line information of a SLA customer according to a type of a line order of the SLA customer is managed through the storing information management unit 500, wherein a type (e.g. an attribute) of a line order is classified into "Receipt", "Change", and "Deletion". For example, when the type of the line order represents "Change", the line information of the customer is updated through the storing information management unit 500. The line information management unit 100 transfers the updated SLA management data to the monitoring management unit 700, thereby performing the integrated monitoring. The line information management unit 100 performs the index management function for the customized index when the customized index of the SLA customer is changed. The customized index signifies the service quality level contracted with the SLA customer and the service quality includes service quality level opening quality management, fault quality management, and communication quality management, etc. The level of the service quality may be determined based on the quality managements.

The opening quality management manages the time keeping needed from the subscription date of the SLA customer to the opening due date. The customized index means the opening processing delay. The fault quality management manages the time keeping needed from the fault generation receipt time to the fault process completing time and the customized index signifies the fault processing delay. The communication quality management manages the network transmission level while the SLA customer uses services in the network and the customized index signifies the packet delay rate, the packet loss rate, and available rate, etc.

The fault information management unit 200 receives the fault information of the SLA customer line from the fault management system 22 and manages it.

The traffic information management unit 300 periodically collects and manages the SLA customer traffic information from the traffic collection management system 25.

The compensation management unit 400 calculates and processes the compensation rates of next month according the agreement information of the SLA contract as much as the value for the SLA contract violating line that violates the service quality level.

The storing information management unit 500 transfers the related information for providing the stored customized SLA monitoring service when being requested by each component 100 to 400 and 600 to 900 included in the customized SLA monitoring management system 10. Further, the storing information management unit 500 performs a role of managing and storing the SLA management data in a database.

The statistic information management unit 600 generates and provides the statistic information for the customized SLA information of the SLA customer collected from the external system 20. The customized SLA information signifies all the information generated by being associated with the customized index set by the customer when being subscribed in the customized SLA monitoring service.

The monitoring management unit 700 monitors the SLA customer line as well as monitors the external system 20 to perform the integrated monitoring, thereby providing the customized SLA monitoring services.

The external system quality collecting unit 800 periodically collects the traffic information of the SLA customer network collected by being distributed for each service in the external system 20 through the traffic collection management system 25.

The external system event collecting/linking unit 900 receives the SLA customer related data information from the line management system 21, the fault management system 22, the compensation management system 23, and the facility management system 24 of the external system 20 or collects data by being linked with the systems 21 to 24.

Figure 2:
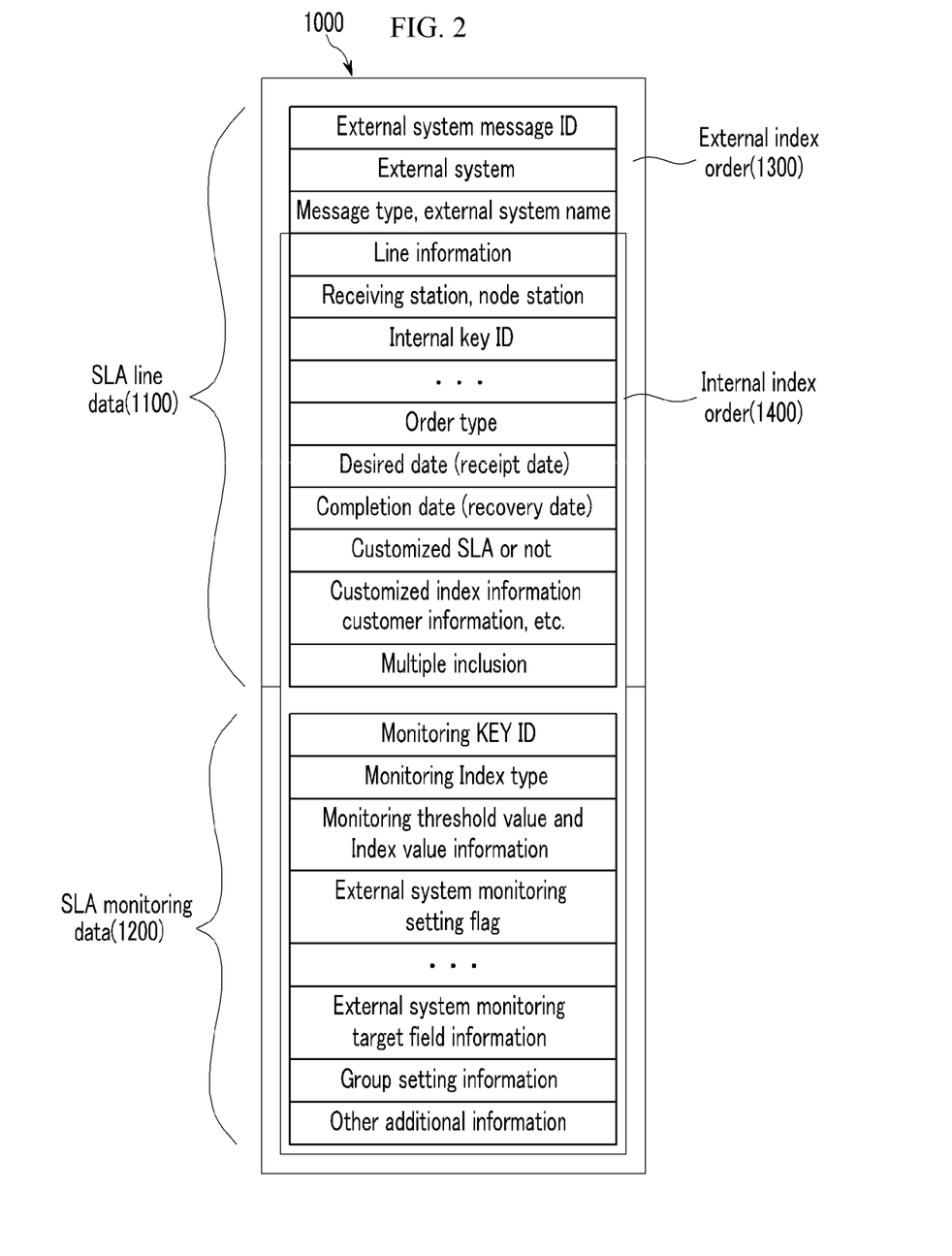
FIG. 2 is a diagram showing one example of an SLA management data according to an exemplary embodiment of the present invention.

FIG. 2 is a diagram showing one example of an SLA management data according to an exemplary embodiment of the present invention.

As shown in FIG. 2, an SLA management data 1000 according an exemplary embodiment of the present invention includes an SLA line data 1100 and an SLA monitoring data 1200.

The SLA line data 1100 includes an external system message identifier (ID), an external system message type, an external system name, line information, a receiving station, a node station, an internal key identifier (ID), an order type, a desired date (receipt date), a completion date (recovery date), customized SLA subscription information, customized index information and SLA customer information.

The SLA monitoring data 1200 includes a monitoring key identifier (ID), a monitoring index type, a monitoring threshold value, an index value, an external system monitoring setting flag, external system monitoring target field information, group setting information, and other additional information. The monitoring key identifier according to the exemplary embodiment of the present invention is a core component that links monitoring related data between the system 10 for managing customized SLA monitoring and the external system 20, which integrates monitoring terms and related information.

The SLA management data 1000 may be sorted into an external index order 1300 including the entire order information and an internal index order 1400 that internally extracts only the necessary data.

The external index order 1300 includes the external system message identifier, the external system message type, the external system name, the line information, the receiving station, the node station, the internal key identifier, the order type, the desired date (receipt date), the completion date (recovery date), the customized SLA subscription information, the customized index information, the SLA customer information, the monitoring key identifier, the monitoring index type, the monitoring threshold value, the index value, the external system monitoring setting flag, the external system monitoring target field information, the group setting information, and other additional information all of which are the entire order information.

The internal index order 1400 includes the line information, the receiving station, the node station, the internal key identifier, the order type, the desired date (receipt date), the completion date (recovery date), the customized SLA subscription information, the customized index information, the SLA customer information, the monitoring key identifier, the monitoring index type, the monitoring threshold value, the index value, the external system monitoring setting flag, the external system monitoring target field information, the group setting information, and other additional information all of which are internally necessary data in the external index order 1300.

The SLA management data 1000 as in FIG. 2 may be stored and managed in a table of the database. The table is formed according to SLA management data 1000 and may comprise a plurality of fields. Each field in the table may correspond to each data of the SLA management data 1000.

Figure 3:
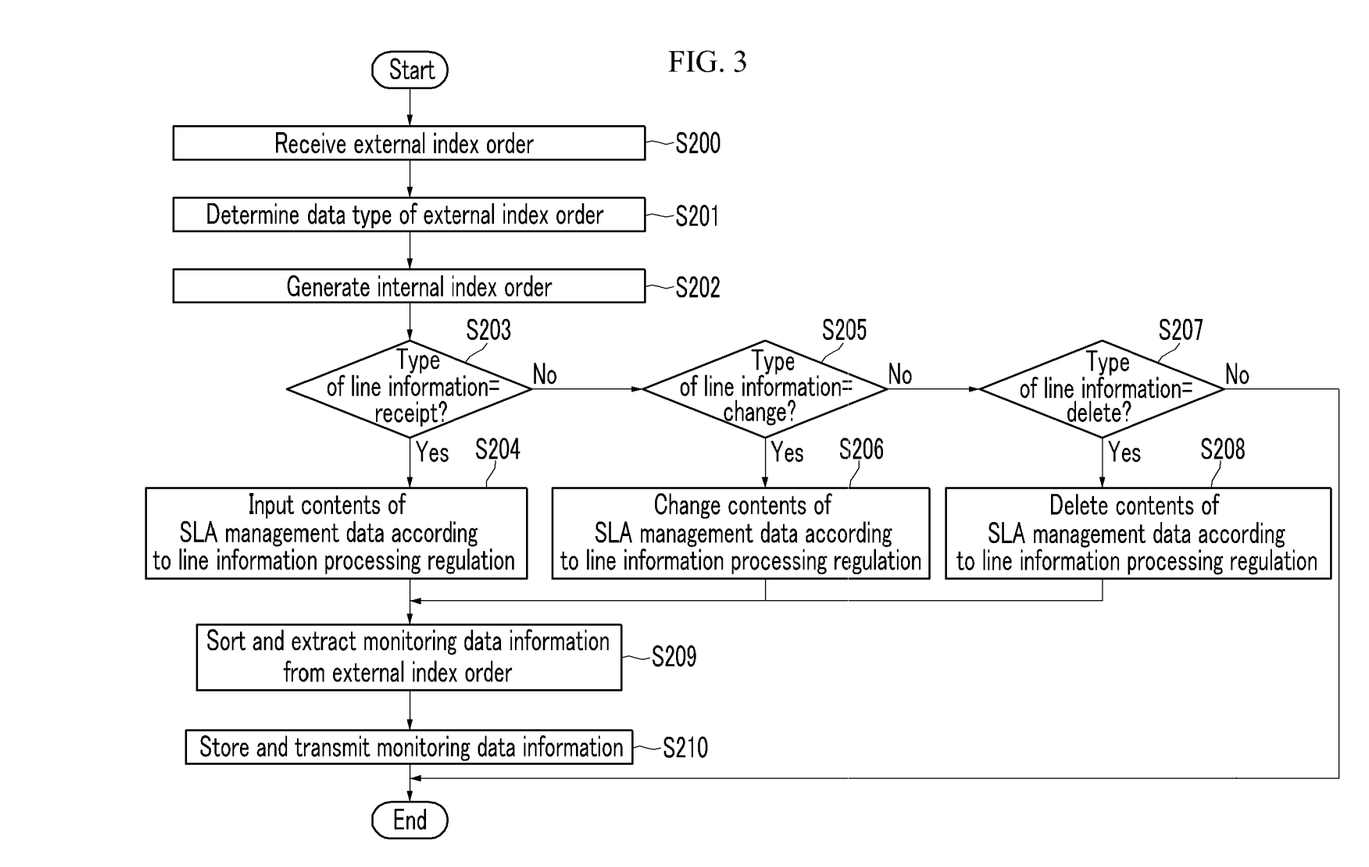
FIG. 3 is a diagram showing one example of updating the SLA management data according to an exemplary embodiment of the present invention.

FIG. 3 is a diagram showing one example of updating the SLA management data according to an exemplary embodiment of the present invention.

Referring to FIGS. 1 and 3, the line information management unit 100 in the system 10 for managing customized SLA monitoring according to the exemplary embodiment of the present invention receives the external index order 1300 associated with the line and fault of the SLA customer, etc., from the line management system 21 and the fault management system 22 of the external system 20 through an external system event collecting/linking unit 900 (S200).

The line information management unit 100 determines whether the type of SLA management data 1000 pre-stored in the information management unit 500 corresponds to the type of the external index order 1300 in order to determine the data type of the external index order 1300 (S201). The line information management unit 100 analyzes the external index order 1300 and extracts only the necessary parameters from the external index order 1300, thereby generating an internal index order 1400 (S202).

When the type (e.g. attribute) of the line information in the internal index order 1400 represents "Receipt", the line information management unit 100 inputs and stores the contents of the SLA management data 1000 in the table of the database through the storing information management unit 500 according to the line information processing regulation (S203 and S204). When the type of the line information in the internal index order 1400 represents "Change", the line information management unit 100 changes the corresponding contents of the SLA management data 1000 stored in the table of the database through the storing information management unit 500 according to the line information processing regulation (S205 and S206). When the type of the line information in the internal index order 1400 represents "Delete", the line information management unit 100 deletes the corresponding contents of the SLA management data 1000 stored in the table of the database through the storing information management unit 500 according to the line information processing regulation (S207 and S208).

The line information management unit 100 classifies and extracts the monitoring data information in the external index order 1300 (S209). The line information management unit 100 adds, changes, or deletes and updates the monitoring data information in the table formed according to the SLA management data 1000.

The line information management unit 100 transfers the updated SLA management data 1000 to the monitoring management unit 700 and performs the management function (S210).

Figure 4:
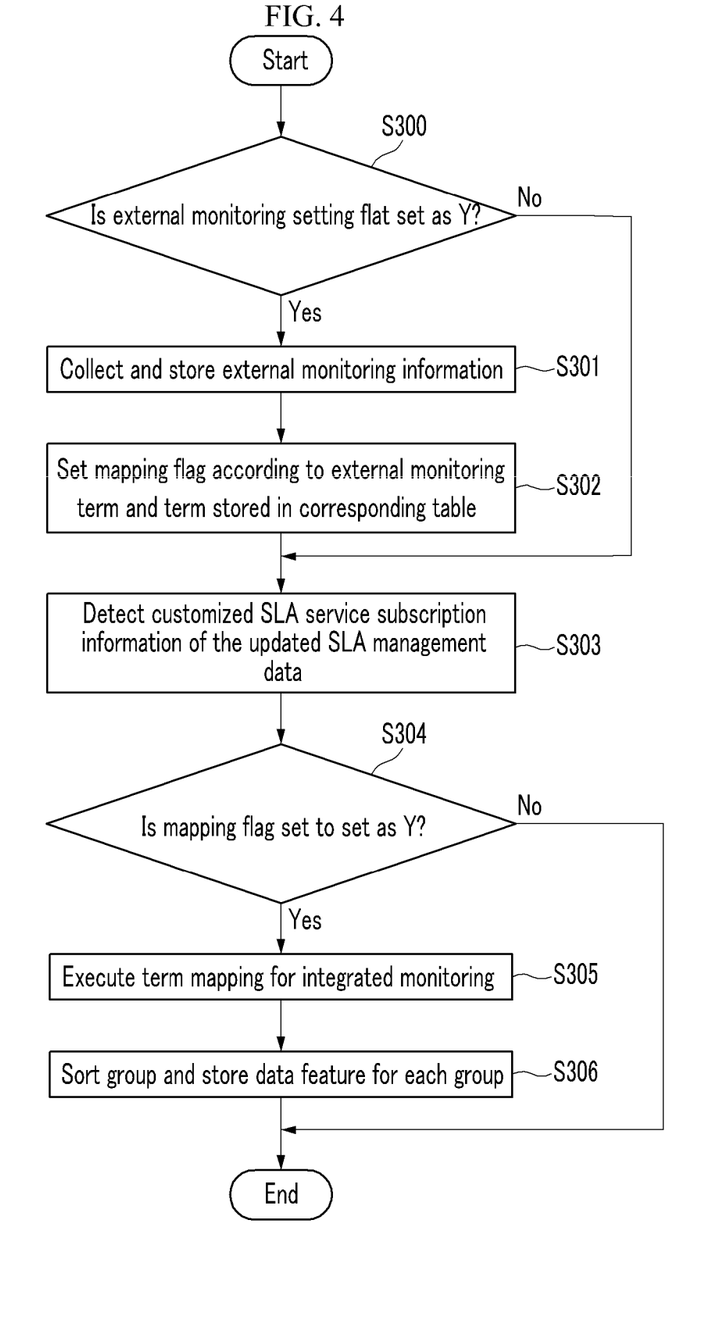
FIG. 4 is a diagram showing a sequence performing pre-processing for integrated monitoring in the monitoring management unit of the system for managing customized SLA monitoring shown in FIG. 1.

FIG. 4 is a diagram showing a sequence performing preprocessing for integrated monitoring in the monitoring management unit of the system for managing customized SLA monitoring shown in FIG. 1.

Referring to FIGS. 1 and 4, in the monitoring management unit 700 in the system 10 for managing customized SLA monitoring according to the exemplary embodiment of the present invention receives the SLA management data 1000 updated from the line information management unit 100 to perform the preprocessing for the integrated monitoring.

First, the monitoring management unit 700 determines whether the external system monitoring setting flag of the updated SLA management data 1000 is set as Y (here, Y represents that a corresponding flag is set) (S300).

At step S300, when the external system monitoring setting flag is set as Y, the monitoring management unit 700 collects the external monitoring information such as the receipt time, the completing time, the average processing time of the worker, the work scheduling time, the current load factor of the worker, and so on, from the line management system 21 and the facility management system 24 based on the external system monitoring field information of the SLA management data 1000 and stores them in a field of the table corresponding to the external system monitoring target field information (S301).

It is assumed that the external monitoring information according to the exemplary embodiment of the present invention is extracted from the line management system 21 and the facility management system 24.

The monitoring management unit 700 sets the mapping flag as Y when the terms of the external monitoring information conform to the terms stored in the corresponding field of the table. Meanwhile, the monitoring management unit 700 sets the mapping flat as N (here, N represents that a corresponding flag is reset) when the terms of the external monitoring information do not conform to the terms stored in the corresponding field of the table (S302). The monitoring management unit 700 detects the customized SLA subscription information of the updated SLA management data 1000 (S303).

The monitoring management unit 700 determines whether the mapping flag set as Y (S304).

At step S304, when the mapping flag is not set as (Y, the monitoring management unit 700 represents that the integrated management is not made due to the mismatch between the external monitoring information and the customized SLA monitoring service, such that it automatically performs the mapping between the terms for the integrated monitoring for the external monitoring information and the terms for the SLA monitoring service (S305). The monitoring management unit 700 sorts the group for the monitoring based on the group setting information of the SLA management data 1000. The monitoring management unit 700 stores the characteristics of the data characteristics of the sorted group and ends the order processing (S306). At this time, the group setting may be added/changed/deleted according to the order types. The group setting manages the group information to be set by the operator through the order and the group mainly includes the SLA line for each customer, the system 10 for managing customized SLA monitoring, and the external system 20 and may be sub-divided into predetermined groups according to the combination among the SLA line for each customer, the system 10 for managing customized SLA monitoring, and the external system 20.

As step S304, when the mapping flag is set as Y, the monitoring management unit 700 represents that there is no need to add, or change the monitoring terms due to the mapping of the external monitoring information between the line management system 21 and the facility management system 24 and the terms for the customized SLA monitoring service and thus, ends the corresponding order processing.

At step S300, when the external system monitoring setting flag is not set as Y, the monitoring management unit 700 executes the same process from step S303.

Figure 5:
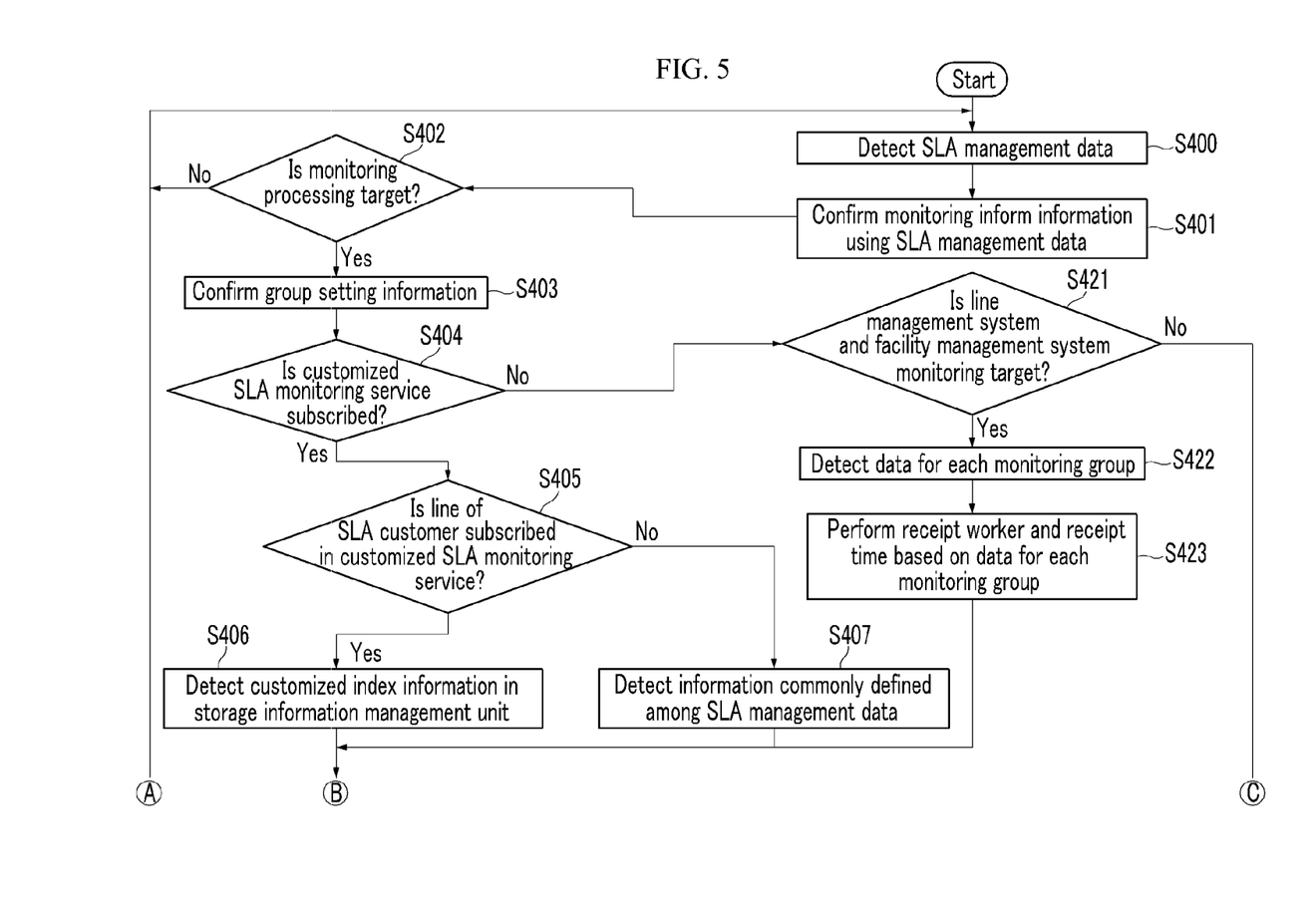
FIGS. 5 and 6 are diagrams showing a sequence providing the integrated monitoring according to an exemplary embodiment of the present invention.
Figure 6:
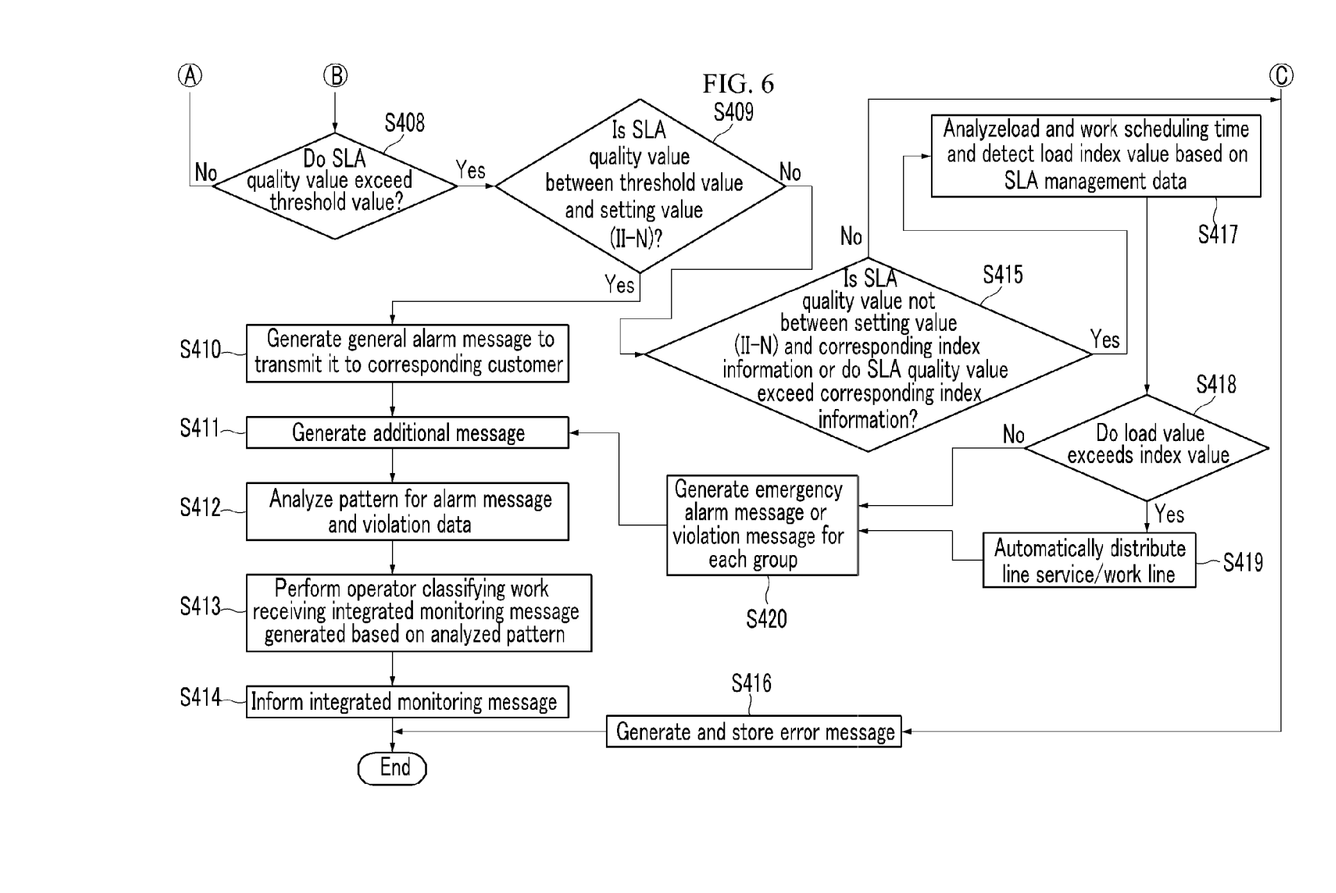

FIGS. 5 and 6 are diagrams showing a sequence providing the integrated monitoring according to an exemplary embodiment of the present invention.

Referring to FIGS. 5 and 6, the system 10 for managing customized SLA monitoring according to the exemplary embodiment of the present invention is periodically driven according to a period that is set by the operator and the stored in the storing information management unit 500 in order to provide the customized SLA monitoring service. The monitoring management unit 700 in the system 10 for managing customized SLA monitoring detects all the related SLA management data 1000 for the current SLA customer lines from the storing information management unit 500 (S400). The monitoring management unit 700 confirms the monitoring informing information such as whether to inform the operator or the SLA customer of the monitoring of the current line, the monitoring informing period, and the recent informing time, etc., the SLA management data 1000 (S401). Herein, the monitoring informing period means the time when the SLA management data 1000 is informed to the operator or the SLA customer. For example, when the operator or the SLA customer wants to receive once the SLA monitoring message generated according to the processing of the monitoring for 1 hour, the message informing period may be set to 60 minutes. The SLA monitoring message according to the exemplary embodiment of the present invention includes the general alarm message, the emergency alarm message, and the violation message. The SLA monitoring message may include all or a portion of the SLA management data 1000 such as the message identifier, the customized SLA index value, the SLA quality value, the worker name, the receiving station, the line number, the work scheduling time, the load rate of the worker, breach of contract or not, the customer information, etc.

If the SLA monitoring message is not yet informed to the operator or the SLA customer or the SLA monitoring message is informed to the operator but the value obtained by subtracting the time when the SLA management data 1000 is informed to the operator from the current time of the system is larger than the monitoring informing period, since it becomes the monitoring processing target to be informed to the operator, the monitoring management unit 700 confirms the group setting information (S402 and S403).

The monitoring management unit 700 determines whether it subscribed in the customized SLA monitoring service based on the customized SLA subscription information of the SLA management data 1000. The monitoring management unit 700 determines whether to monitor only the customized SLA monitoring management system 10 or whether to perform the integrated monitoring including the external system 20 according to the group setting information (S404).

As the determination result at step S404, only when the system 10 for managing customized SLA monitoring is monitored, the monitoring management unit 700 determines whether it is the SLA customer line that is subscribed in the customized SLA monitoring service (S405). In the case of the SLA customer line subscribing in the customized SLA monitoring service, the monitoring management unit 700 detects the customized index information in the storing information management unit 500 (S406). When the SLA customer line is not subscribed in the customized SLA monitoring service, since the monitoring management unit 700 is the line of the service-centered subscriber, it detects the commonly defined information, for example, the common index information in the SLA management data 1000 (S407). In other words, the SLA customer line subscribed in the customized SLA monitoring service is set to have different indexes for each customer and the customer line of the service-centered line are set to have the same indexes.

The monitoring management unit 700 determines whether the collected SLA quality value (hereinafter, referred to as "SLA quality value") exceeds the threshold value (S408). Herein, the threshold value is a reference value for monitoring the customized index information or the common index information and may be set differently according to the setting of the user. When the SLA quality does not exceed the threshold value, the monitoring management unit 700 does not generate an alarm and therefore, returns to step S400. When the SLA quality value exceeds the threshold value, the monitoring management unit 700 determines whether the SLA quality is larger than the threshold value and is smaller than a setting value (S409). The setting value represents the result of subtracting N from corresponding index information, that is, "corresponding index information N". The corresponding index information means a value representing the customized index information or the common index information that is set by the SLA contract. At this time, N may be set as any index value and the range of N is limited to the value between the threshold valued and the corresponding index information. Hereinafter, the setting value will be referred with II-N, wherein II represents "corresponding index information".

At step S409, when the SLA quality is a value between the threshold value and the setting value (II-N), the monitoring management unit 700 generates the general alarm message and transfers it to the corresponding customer (S410). The monitoring management unit 700 further generates the messages including the processing step information for each service progress and worker through the external linking for each system (S411). The monitoring management unit 700 analyzes the pattern information of the alarm and violation data (S412). The monitoring management unit 700 performs the operator sorting work for the operator receiving the messages based on the specific area or the specific line where the alarm and the violation data are frequently generated. (S413). At this time, the operator sorting work is performed to inform necessary messages only to the operator that corresponds to the corresponding area and the corresponding business. The monitoring management unit 700 informs the operator or the SLA customer of the integrated monitoring messages in real time (S414).

At step S409, when the SLA quality value does not have the value between the threshold value and the setting value (II-N), the monitoring management unit 700 determines whether the SLA quality value does not have the value between the setting value (II-N) and the corresponding index information or the SLA quality value exceeds the corresponding index information (S415).

When the SLA quality value is a value between the setting value (II-N) and the corresponding index information or the SLA quality value does not exceed the corresponding index information, the monitoring management unit 700 generates and stores the error messages and ends it since the system 10 for managing customized SLA monitoring and the monitoring type of the external system 20 does not match each other (S416). When the SLA quality value is a value between the setting value (II-N) and the corresponding index information or the SLA quality value exceeds the corresponding index information, the monitoring management unit 700 analyzes the load of the receipt worker and the work scheduling time of the line management system 21 and the facility management system 24 in the external system 20. The monitoring management unit 700 detects the load index value of the worker in the line management system 21 and the facility management system 24 based on the SLA management data 1000 (S417).

The monitoring management unit 700 determines whether the load value of the receipt worker exceeds the load index value (S418).

At step S418, when the load value of the receipt worker exceeds the load index value, the monitoring management unit 700 automatically distributes and processes the working line in the line management system 21 or the facility management system 24 since the line allocated to the worker is more likely to be violated. At this time, the automatic distribution of the work line allocates the line to the worker having low load factor to increase the working efficiency. To this end, the worker is changed in the line management system 21 or the facility management system 24 (S419). The monitoring management unit 700 is performed after step S420.

At step S418, when the load value of the receipt worker does not exceed the load index value, the monitoring management unit 700 generates the emergency alarm message or the violation message for each group (S420). The monitoring management unit 700 is performed after step S411.

As the determination result at step S404, when the system 10 for managing customized SLA monitoring is not monitored, the monitoring management unit 700 determines whether the line management system 21 and the facility management system 24 in the external system 20 are the monitoring target (S421). When the line management system 21 and the facility management system 24 are not the monitoring target, the monitoring target type does not match each other, such that the monitoring management unit 700 performs step S416 to generate and store the error message and end step S416. When the line management system 21 and the facility management system 24 are the monitoring target, the monitoring management unit 700 detects data for each monitoring group including the information the line management system 21 and the facility management system 24 based on the SLA management data 1000 (S422). The monitoring management unit 700 starts the monitoring of the receipt worker and the receipt time based on data for each monitoring group (S423). The monitoring management unit 700 performs the process after step S408.

According to an exemplary embodiment of the present invention, it provides the customized SLA monitoring service depending on the customized indexes set by each customer to provide the customer-centered quality of service, deviating from the quality index unilaterally provided by the service provider, thereby making it possible to improve the customer satisfaction.

Further, according to an exemplary embodiment of the present invention, it provides an automatic distributing function in consideration of the handling load factor and the work handling time of the worker of the system operated by being connected with the line of the customized SLA management system, thereby making it possible to improve the work efficiency and the quality of service.

Further, according to an exemplary embodiment of the present invention, it provides the integrated monitoring method including the information on the external systems service for keeping the service level in order for the operator or the customer to simultaneously satisfy the demand level for quality and the expectation level, thereby making it possible to efficiently perform the SLA quality management.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for managing customized service level agreement (SLA) monitoring by being linked with an external system, comprising:
    a line information management unit that is linked with the external system to receive an external index order for a customer line subscribed in a customized SLA monitoring service and update SLA management data by reflecting demand of the customer included in the external index order on the SLA management data; and
    a monitoring management unit that performs integrated monitoring on the external system linked with the customer line by using the SLA management data updated by the line information management unit,
    wherein the monitoring management unit maps a monitoring term for the integrated monitoring by using the SLA management data and performs the integrated monitoring,
    wherein the line information management unit extracts the monitoring data information from the external index order and reflects contents corresponding to the monitoring data information on a table that is formed corresponding to the SLA management data, and
    wherein the SLA management data includes customized SLA subscription information, customized index information, an external system monitoring setting flag, a monitoring key identifier, and group setting information.

2. The system of claim 1, wherein:
    the monitoring management unit collects external monitoring information from the external system according to a setting value of the external system monitoring setting flag.

3. The system of claim 2, wherein:
the external monitoring information includes at least one of receipt time, completing time, average processing time of a worker, work scheduling time, and a current load factor of a worker.

4. The system of claim 3, wherein:
the monitoring management unit determines whether a term of the external monitoring information conforms with a term stored in a corresponding field of the table to set a mapping flag and performs mapping between the terms according to a setting value of the mapping flag.

5. The system of claim 1 wherein:
the monitoring management unit determines whether to monitor the external system according to the group setting information.

6. A method for managing customized SLA monitoring by being linked with an external system, comprising:
receiving an external index order for a customer line subscribed in a customized SLA monitoring service by being linked with the external system;
updating SLA management data by reflecting demands of the customer included in the external index order on the SLA management data;
determining whether to monitor the external system by using the updated SLA management data; and
performing integrated monitoring on the customer line and the external system according the result of the determination,
wherein the updating SLA management data includes extracting monitoring data information from the external index order and reflecting contents corresponding to the monitoring data information on a table that is formed corresponding to the SLA management data, and
wherein the SLA management data includes customized SLA subscription information, customized index information, an external system monitoring setting flag, a monitoring key identifier, and group setting information.

7. The method of claim 6, wherein:
the determining whether to monitor the external system includes
collecting external monitoring information from the external system according to a setting value of the external system monitoring setting flag,
setting a mapping flag by determining whether a term of the external monitoring information conforms with a term stored in a corresponding field of the table; and
performing mapping between the terms according to a setting value of the mapping flag.

8. The method of claim 7, wherein:
the external monitoring information includes at least one of receipt time, completing time, average processing time of a worker, work scheduling time, and a current load factor of a worker.

9. The method of claim 7, wherein:
the determining whether to monitor the external system further includes
determining whether to monitor the external system according to the group setting information.

10. The method of claim 6, wherein:
the performing integrated monitoring includes
determining whether the line is a customer line subscribed in the customized SLA monitoring service by using the customized SLA subscription information, and
if it is determined that the line is the customer line subscribed in the customized SLA monitoring service, determining whether the customer line is normal according to whether the customized index information exceeds a predetermined value.

* * * * *